(12) United States Patent
Kim et al.

(10) Patent No.: US 8,391,406 B2
(45) Date of Patent: Mar. 5, 2013

(54) APPARATUS AND METHOD FOR AMPLIFYING SIGNAL AND WIRELESS TRANSMITTER USING THE SAME

(75) Inventors: Joon-Hyung Kim, Daejon (KR); Kwang-Chun Lee, Daejon (KR); Gweon-Do Jo, Daejon (KR); Jae-Ho Jung, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 448 days.

(21) Appl. No.: 12/620,739

(22) Filed: Nov. 18, 2009

(65) Prior Publication Data

US 2010/0150262 A1 Jun. 17, 2010

(30) Foreign Application Priority Data

Dec. 16, 2008 (KR) ........................ 10-2008-0127722

(51) Int. Cl.
   *H04L 25/49* (2006.01)
(52) U.S. Cl. .................... 375/297; 375/286; 375/295
(58) Field of Classification Search .................. 375/297, 375/286, 302, 295, 222; 455/118; 332/103
   See application file for complete search history.

(56) References Cited

U.S. PATENT DOCUMENTS 5,751,696 A    5/1998  Bechtel et al.
6,147,553 A    11/2000 Kolanek
6,529,716 B1   3/2003  Eidson et al.
7,696,818 B2 * 4/2010  Kunihiro et al. ................ 330/10
7,944,994 B2 * 5/2011  Matsuura et al. ............. 375/302
2007/0018718 A1* 1/2007 Horng et al. .................... 330/10
2007/0052475 A1* 3/2007 Smiley ...................... 330/124 R
2007/0127761 A1* 6/2007 Poulsen ........................ 381/355
2010/0183093 A1* 7/2010 Ghannouchi et al. ......... 375/302

FOREIGN PATENT DOCUMENTS

JP     4-172035        6/1992
KR     1999-0076536   10/1999
KR     1020060038134   5/2006
KR     1020080069257   7/2008
WO     2007/120281 A2 10/2007

* cited by examiner

*Primary Examiner* — Shuwang Liu
*Assistant Examiner* — Helene Tayong
(74) *Attorney, Agent, or Firm* — Nelson Mullins Riley & Scarborough LLP; EuiHoon Lee, Esq.

(57) ABSTRACT

Provided are a signal amplifying apparatus and method and a wireless transmitter using the same. The signal amplifier includes a polar coordinate converter configured to output an envelope signal and a phase signal by converting a signal to a polar coordinate, a multilevel quantizer configured to output a multilevel quantized signal by quantizing the envelope signal to multiple levels, an amplification state controller configured to control an amplification state using the multilevel quantized signal, and a power amplifier configured to amplify the phase signal according to the controlled amplification state.

15 Claims, 8 Drawing Sheets

APPARATUS AND METHOD FOR AMPLIFYING SIGNAL AND WIRELESS TRANSMITTER USING THE SAME

CROSS-REFERENCE TO RELATED APPLICATIONS

The present invention claims priority of Korean Patent Application Nos. 10-2008-0127722, filed on Dec. 16, 2008, which is incorporated herein by reference.

BACKGROUND OF THE INVENTION

1. Field of the Invention

The present invention relates to an apparatus and method for amplifying a signal, and a wireless transmitter using the same.

2. Description of Related Art

Lately, a mobile communication system has been advanced to transmit data at a high data transmission rate. Accordingly, a related system has been advanced from employing a Code Division Multiple Access (CDMA) scheme to employing an orthogonal frequency division multiplexing (OFDM) scheme. For example, the OFDM scheme has been adapted to a Worldwide Interoperability for Microwave Access (WiMAX) system, a Wireless Broadband (WiBro) system, and a $3^{rd}$ Generation Long-Term Evolution (3G LTE) system.

However, such an OFDM system is disadvantageous in that a peak to average power ratio (PAPR) of a transmission signal increases by summation of a subcarrier. Therefore, many researches have made effort to improve the efficiency of a transmitter of a terminal. As a related method for improving the efficiency, a phase signal is inputted to the power amplifier using polar coordinate conversion and envelope information is applied to a bias unit of a switching power amplifier. The envelope information may be inputted as an analog signal to the bias unit without conversion, or the envelope information may be inputted as a digital signal to the bias unit through analog-digital conversion.

FIGS. 1A and 1B are diagrams illustrating a transmitter according to the prior art.

The transmitter according to the prior art, shown in FIG. 1A, applies envelope information as an analog signal to the bias unit without conversion. Referring to FIG. 1A, the transmitter according to the prior art includes a MODEM 101, a polar coordinate converter 102, an analog convertor 103, a phase modulator 104, a switching power amplifier 105, and a power source 106. The MODEM 101 outputs baseband signals I(t) and Q(t). The polar coordinate converter 102 receives the baseband signals I(t) and Q(t), converts the received baseband signals to a polar coordinate, and outputs phase information and envelope information. The phase modulator 104 up-converts phase information to a radio frequency (RF) and outputs a predetermined sized envelope signal to the switching power amplifier 105. Meanwhile, the envelope information outputted from the polar coordinate converter 102 is applied to the bias unit of the switching power amplifier 105 after passing through the analog converter 103. The switching power amplifier 105 combines the phase information and the envelope information applied to the bias unit and outputs the combined signal. The power source 106 supplies power to the switching power amplifier 105.

A class-B amplifier or a class-AB amplifier may be used as the analog converter 103. However, the transmitter of FIG. 1A is not suitable to a system having an abruptly changing envelope signal because the envelope information is applied to the power amplifier 105 as bias. For example, the OFDM system cannot express an envelope signal smaller than a knee voltage because a VDD/VCC voltage should be greater than a knee voltage to always activate the switching power amplifier 105.

FIG. 1B shows a transmitter applying envelope information as a digital signal to the bias unit. Referring to FIG. 1B, the transmitter includes a MODEM 111, a polar coordinate converter 112, a digital converter 113, a phase modulator 114, a switching power amplifier 115, a power source 116, a power controller 117, and a band pass filter 118. The polar coordinate converter 112 receives baseband signals I(t) and Q(t) from the MODEM 111, converts the received baseband signals I(t) and Q(t), and outputs phase information and envelope information. The phase information is inputted to the switching power amplifier 115 through the phase modulator 114 like the transmitter of FIG. 1A. The digital converter 113 converts the envelope information outputted from the polar coordinate converter 112 to a digital signal in pulse having a predetermined bit sequence. The digital converter 113 may be embodied as a delta-sigma converter. The switching power amplifier 115 receives the pulse type envelope information as bias and combines the received pulse type envelope information with the phase information, and outputs the combined signal. The power source 116 supplies power to the switching power amplifier 115 and the power controller 117 controls the power to the switching power amplifier 115.

The transmitter of FIG. 1B essentially generates quantization noise due to conversion of bit sequence of envelope information. In order to remove quantization noise, the transmitter includes a band pass filter for filtering the output of the switching power amplifier 115. When the transmitter uses the delta-sigma convertor as the digital converter 113, noise shaping of quantization noise is decided by the oversampling rate of envelope information and the order of the delta-sigma converter. In general, a transmitter uses a $2^{nd}$ order delta-sigma converter for system stability. In this case, the oversampling rate of envelope information should be sustained at 16 to 32 in order to remove in-band and out-band noise by a filter. Lately, a high speed data transmitter has wideband characteristics such as a channel bandwidth from 20 MHz to 80 MHz. Therefore, a delta-sigma converter needs to perform oversampling at a high speed such as 2.56 GHz in case of 32 oversampling. Due to such a requirement, it is very difficult to embody the system in hardware. Also, power consumption increases due to a high speed digital circuit.

SUMMARY OF THE INVENTION

An embodiment of the present invention is directed to providing a signal amplifying method and apparatus having a high efficiency even in a wide frequency band, and a wireless transmitter having the same.

Another embodiment of the present invention is directed to providing a signal amplifying method and method for improving channel leakage power characteristics and error characteristics even in a small oversampling rate and a wireless transmitter having the same.

In accordance with an aspect of the present invention, there is provided a signal amplifier including a polar coordinate converter configured to output an envelope signal and a phase signal by converting a signal to a polar coordinate, a multilevel quantizer configured to output a multilevel quantized signal by quantizing the envelope signal to multiple levels, an amplification state controller configured to control an amplification state using the multilevel quantized signal, and a power amplifier configured to amplify the phase signal according to the controlled amplification state.

In accordance with another aspect of the present invention, there is provided a wireless transmitter including a polar coordinate converter configured to output an envelope signal and a phase signal by converting a signal into a polar coordinate, a multilevel quantizer configured to output a multilevel quantized signal by quantizing the envelope signal to multiple levels, an amplification state controller configured to control an amplification state using the multilevel quantized signal, and a power amplifier configured to amplify the phase signal according to the controlled amplification state.

In accordance with another aspect of the present invention, there is provided a method of amplifying a signal including outputting an envelope signal and a phase signal by converting a signal into a polar coordinate, outputting a multilevel quantized signal by quantizing the envelope signal to multiple levels, controlling an amplification state using the multilevel quantized signal, and amplifying the phase signal according to the controlled amplification state.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

BRIEF DESCRIPTION OF THE DRAWINGS

FIG. 7 is a graph illustrating an envelope signal A(t) and a M-level quantized signal a.

DESCRIPTION OF SPECIFIC EMBODIMENTS

Figure 1A:
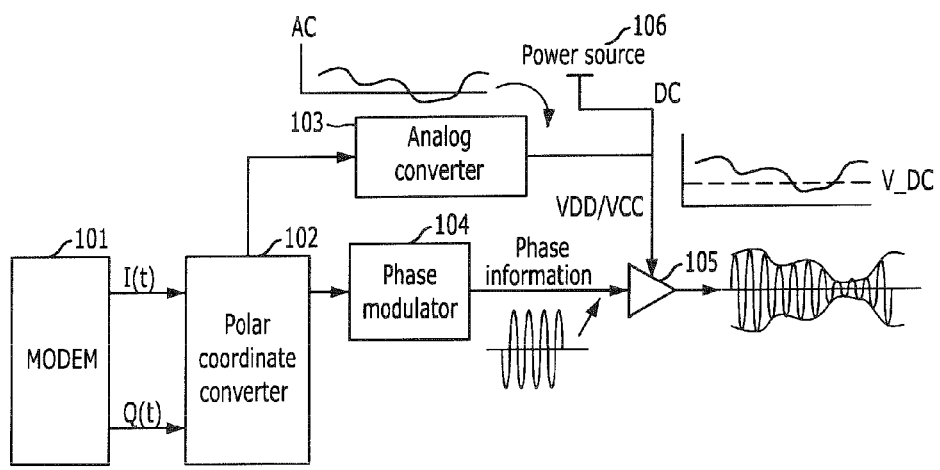
FIGS. 1A and 1B are diagrams illustrating a transmitter according to the prior art.
Figure 1B:
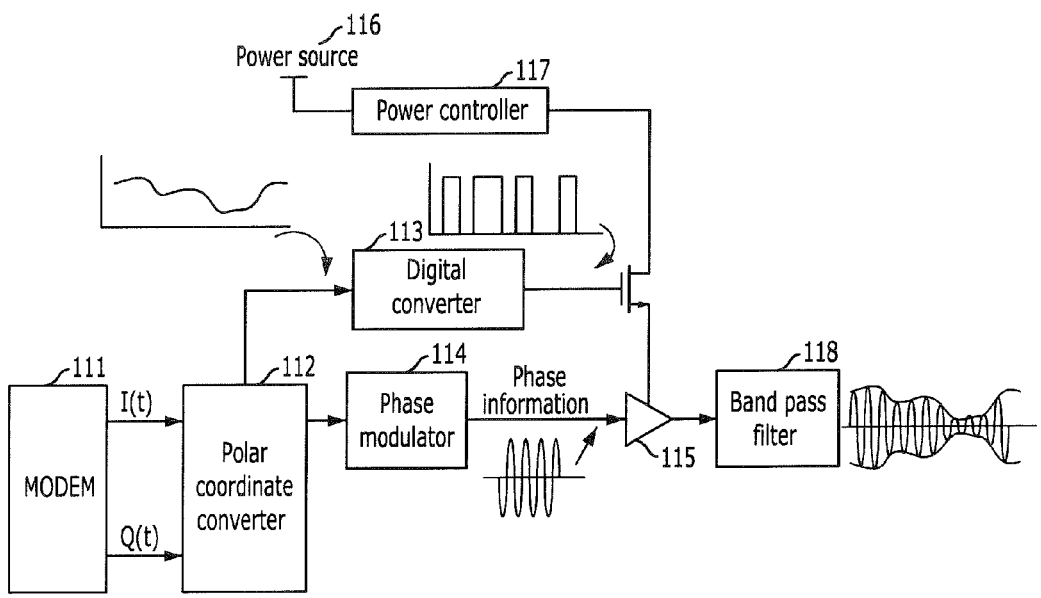

The advantages, features and aspects of the invention will become apparent from the following description of the embodiments with reference to the accompanying drawings, which is set forth hereinafter.

Following description exemplifies only the principles of the present invention. Even if they are not described or illustrated clearly in the present specification, one of ordinary skill in the art can embody the principles of the present invention and invent various apparatuses within the concept and scope of the present invention. The use of the conditional terms and embodiments presented in the present specification are intended only to make the concept of the present invention understood, and they are not limited to the embodiments and conditions mentioned in the specification.

Also, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

For example, block diagrams of the present invention should be understood to show a conceptual viewpoint of an exemplary circuit that embodies the principles of the present invention. Similarly, all the flowcharts, state conversion diagrams, pseudo codes and the like can be expressed substantially in a computer-readable media, and whether or not a computer or a processor is described distinctively, they should be understood to express various processes operated by a computer or a processor.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

In the claims of the present specification, an element expressed as a means for performing a function described in the detailed description is intended to include all methods for performing the function including all formats of software, such as combinations of circuits for performing the intended function, firmware/microcode and the like.

To perform the intended function, the element is cooperated with a proper circuit for performing the software. The present invention defined by claims includes diverse means for performing particular functions, and the means are connected with each other in a method requested in the claims. Therefore, any means that can provide the function should be understood to be an equivalent to what is figured out from the present specification.

Other objects and aspects of the invention will become apparent from the following description of the embodiments with reference to the accompanying drawings, which is set forth hereinafter. The same reference numeral is given to the same element, although the element appears in different drawings. In addition, if further detailed description on the related prior arts is determined to obscure the point of the present invention, the description is omitted. Hereafter, preferred embodiments of the present invention will be described in detail with reference to the drawings.

In the present invention, a signal is amplified using polar coordinate conversion. If the signal is converted to a polar coordinate, an envelope signal and a phase signal are outputted. The envelope signal is quantized to a plurality of levels and used to control a amplification state. The phase signal is amplified according to the controlled amplification state.

As described above, it is difficult to embody an amplifier and a transmitter in a wideband due to quantization noise. However, an amplifier and a wireless transmitter according to the present invention quantize the envelope signal into a plurality of levels. Therefore, the quantization noise can be minimized. Also, the amplifier and the wireless transmitter according to the present invention provide excellent channel leakage power characteristics and error characteristics even in a low oversampling rate. Therefore, the amplifier and the wireless transmitter according to the present invention can perform high efficient amplification even in wideband.

<Signal Amplifier>

Hereinafter, a signal amplifier according to an embodiment of the present invention will be described.

Figure 2:
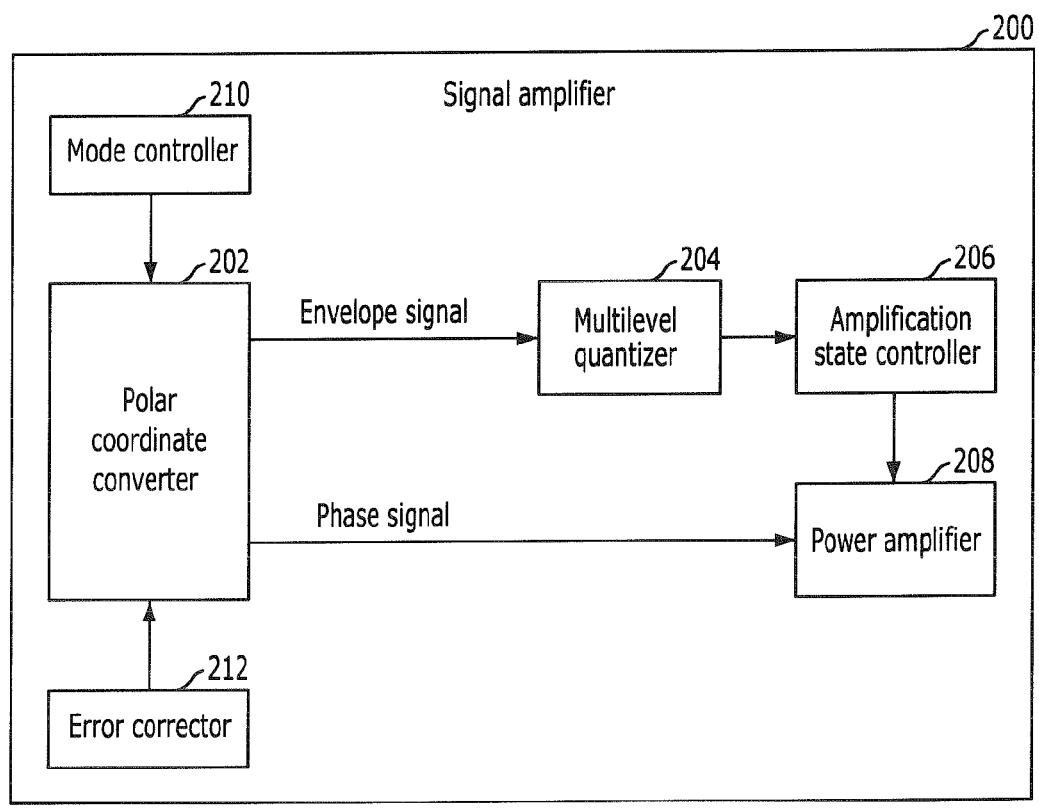
FIG. 2 is a diagram illustrating a signal amplifier 200 in accordance with an embodiment of the present invention.

FIG. 2 is a diagram illustrating a signal amplifier 200 in accordance with an embodiment of the present invention.

The signal amplifier 200 may include the above described amplifiers. The signal amplifier 200 according to the present embodiment includes a polar coordinate converter 202 for converting a signal into a polar coordinate and outputting an envelope signal and a phase signal, a multilevel quantizer 204 for quantizing the envelope signal into multiple levels and outputting a multiple level quantized signal, an amplification state controller 206 for controlling an amplifying state using the multiple-level quantized signal, and a power amplifier 208 for amplifying the phase signal according to the controlled amplifying state.

In a wideband, it is required to sustain a high oversampling rate to embodying a method of converting the envelope signal to a 1-bit digital signal. In this case, it is difficult to embody the method in hardware due to the limitation of integration technology. The number of levels of the envelope signal quantized to have multiple levels may be identical to the number of amplification states of the power amplifier 208. For example, if the envelope signal is quantized to have four levels, the 4-level quantized signals can control each of states of the power amplifier 208 having four states through the amplification state controller 206. Here, the amplification degree may be changed according to each state. As described above, the multiple level quantization reduces the quantization noise and sustains high efficiency even in a wide frequency band.

The amplification state controller 206 may include a level converter (not shown in FIG. 2) for converting the multiple level quantized signal into a control signal having fewer levels than the levels of the multiple level quantized signal, and an amplification state decider (not shown in FIG. 2) for deciding an amplification state according to the control signal. As the number of levels of the multilevel quantizer 204 increases, the complexity of the signal amplifier 200 may become increased and the control of the amplification state may become difficult. Therefore, the complexity and the size of the signal amplifier 200 or the power amplifier 208 may be reduced by using a control signal having fewer levels than the levels of the multiple level quantized signal.

The level converter groups multiple levels to the smaller number of groups and generates a control signal according to the groups. For example, the level converter may be embodied as 16 to 4 multiplexers (Mux). In this case, the level converter converts a 16-level quantized signal into a 4-level control signal. The amplification state decider decides an amplification state according to a control signal outputted from the level converter, thereby controlling the amplification state of the power amplifier 208.

Here, the control signal may be decided using the probability distribution of a signal according to the levels of the multilevel quantized signal. The power amplifier 208 may be optimized and the efficiency thereof may be improved by using the probability distribution or by controlling a size of a phase signal. The power amplifier 208 groups envelope signals having similar output power levels because the efficiency of the power amplifier 208 is not significantly reduced in a region that a difference of the output power level is not great.

For example, when the envelope signal is quantized to levels, the signal may not have high probability distribution at the $16^{th}$ level of the signal. However, the signal may have high probability distribution at middle levels such as $4^{th}$ to $8^{th}$ levels or $9^{th}$ to $13^{th}$ levels. Therefore, a control signal may be decided according to such probability distribution. For example, a multilevel quantized signal having 16 levels may be converted to a control signal having 4 levels as shown in Table 1.

TABLE 1

| Multilevel quantized signal (No. of levels: 16) | Control signal (No. of levels: 4) |
| --- | --- |
| $1^{st}$ to $3^{rd}$ levels | 1 |
| $4^{th}$ to $8^{th}$ levels | 2 |
| $9^{th}$ to $13^{th}$ levels | 3 |
| $14^{th}$ to $16^{th}$ levels | 4 |

A size of a phase signal may be controlled according to a size of an envelope signal. Since the power amplifier 208 is controlled by a control signal having fewer levels than those of the multilevel quantized signal, the high efficiency can be sustained by controlling the phase signal inputted to the power amplifier 208. Hereinafter, controlling a size of a phase signal in proportion to a size of an envelope signal will be described. The $1^{st}$ to $3^{rd}$ levels of the quantized signals are converted to the $1^{st}$ level of the control signal and provided as bias of the power amplifier 208. However, the phase signals become different in size because the $1^{st}$ to $3^{rd}$ levels are different in size. Therefore, the output of the power amplifier 208 can express all levels of the multilevel quantized signal.

Meanwhile, the multilevel quantized signal can be generated by delta-sigma converting the envelope signal. The delta-sigma modulator is a closed loop system and can sustain a full scale rate of an input signal and the digital mean number of an output signal to be identical.

When the output power level of the power amplifier 208 is set to be identical to or greater than a preset power level, the signal amplifier 200 may further include a mode controller 210 for controlling the polar coordinate converter 202 to output an envelope signal and a phase signal. Here, the preset power level may be an output power level corresponding to a knee voltage of amplification. By controlling the polar coordinate converter 202 according to an output power level of amplification through the mode controller 210, the limitation of input voltage of the power amplifier 208 can be solved and the dynamic range of the power amplifier 208 can be extended.

It is necessary to use different methods of amplifying power according to an output power level of the power amplifier 208. For example, when a voltage applied to the power amplifier 208 is lower than a knee voltage, the power amplifier 208 may not be activated. The envelope signal may become smaller than the knee voltage. In this case, the mode controller 210 is used because the power amplifier 208 cannot perform the amplification. The mode controller 210 may control the polar coordinate converter 202 to be operated when the output power level is setup to be greater than or equal to the preset power level. Therefore, the polar coordinate converter 202 may be not operated in other cases, and the signal amplifier 200 may transmit a signal using a typical direct conversion method. In order to overcome such a problem, it is possible to control the multilevel quantizer 204 to output a level higher than a predetermined value.

The signal amplifier 200 may further include an error corrector 212 for controlling a size or a phase value of a phase signal according to at least one of a supply voltage of the power amplifier 208, an input power of the power amplifier 208, and an amplification state. By controlling the phase value or the size of the phase signal through the error corrector 212, it is possible to correct error occurring from the signal amplifier 200.

The power amplifier 208 according to the present embodiment may cause an error due to semiconductor characteristics when the power amplifier 208 is embodied to a semiconductor. Since such an error is reflected as a phase error or a gain to a final output, the channel leakage power characteristics and the error characteristics are deteriorated. In order to correct the error, the error corrector 212 may be used. The error corrector 212 may correct error by controlling a phase value or a size of a phase signal.

<Wireless Transmitter>

Hereinafter, a wireless transmitter according to an embodiment of the present invention will be described.

The wireless transmitter according to the present embodiment may include the above described signal amplifier according to the present embodiment. The wireless transmitter according to the present embodiment includes a polar coordinate converter for converting a signal to a polar coordinate and outputting an envelope signal and a phase signal, a multilevel quantizer for quantizing the envelope signal to multiple levels and outputting a multilevel quantized signal, an amplification state controller for controlling an amplification state using the multilevel quantized signal, and a power amplifier for amplifying the phase signal according to the controlled amplification state. The wireless transmitter according to the present embodiment can reduce quantization noise and sustain high efficiency in a wide frequency band using the multilevel quantization.

The amplification state controller may include a level converter for converting the multilevel quantized signal to a control signal having fewer levels than the multilevel quantized signal and an amplification state decider for deciding an amplification state according to a control signal. Since the control signal having fewer levels than the multilevel quantized signal is used, the complexity and the size of the wireless transmitter or the power amplifier can be reduced.

The control signal may be decided using probability distribution of a signal according to a level of the multilevel quantized signal. The size of the phase signal may be controlled according to a size of an envelope signal. The power amplifier may be optimized and the efficiency thereof may be improved by using the probability distribution and controlling the size of the phase signal.

Meanwhile, the multilevel quantized signal may be generated by delta-sigma converting the envelope signal.

The wireless transmitter may further include a mode controller for controlling the polar coordinate converter to output an envelope signal and a phase signal when the output power level of the power amplifier is set to be identical to or greater than a preset power level. Here, the preset power level may be an output power level corresponding to a knee voltage of amplification. It is possible to overcome a problem of limiting an input voltage of a power amplifier and to widen a dynamic range of a power amplifier by controlling the polar coordinate converter according to an output power level of amplification through the mode controller.

Meanwhile, the wireless transmitter may further include an error corrector for controlling a phase value or a size of a phase signal according to at least one of a supply voltage of a power amplifier, an input power of a power amplifier, and an amplification state. It is possible to correct error that may occur in the wireless transmitter by controlling a phase value and a size of the phase signal through the error corrector.

Since other constituent elements of the wireless transmitter are identical to those of the signal amplifier, the description thereof is omitted.

<Signal Amplification Method>

Hereinafter, a method for amplifying a signal in accordance with an embodiment of the present invention will be described.

Figure 3:
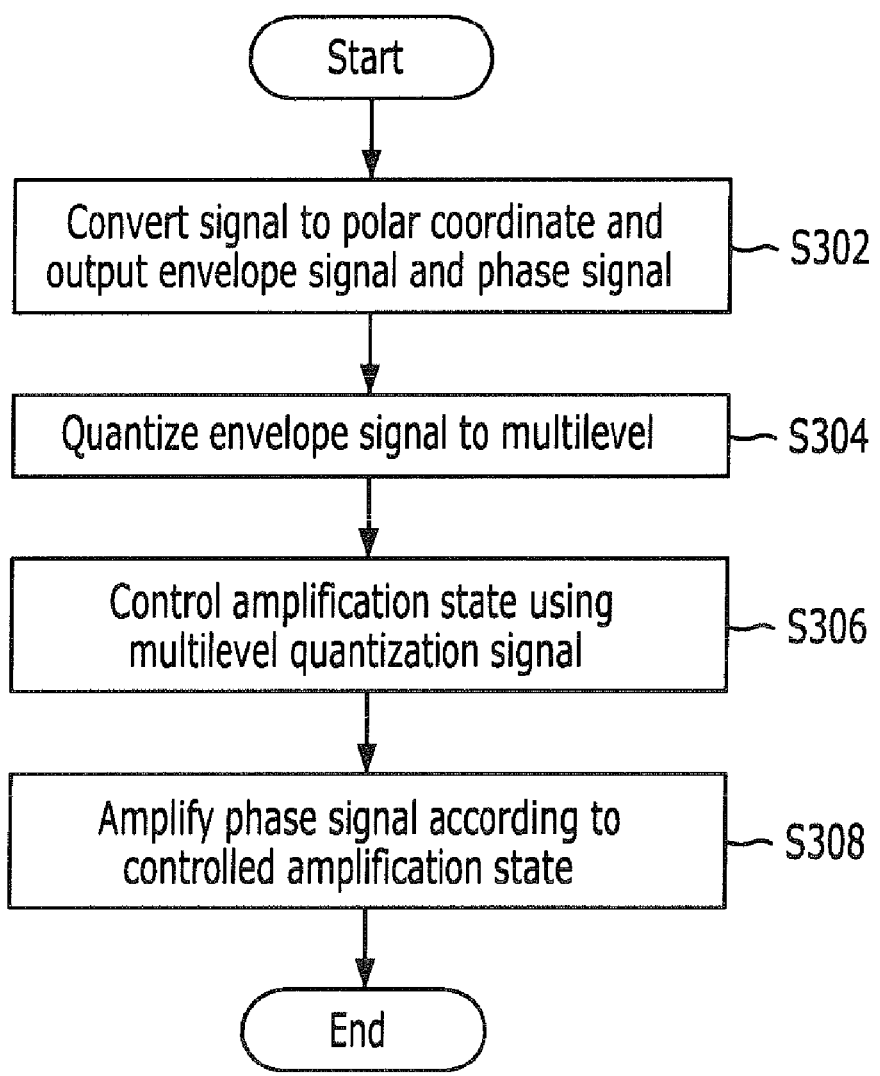
FIG. 3 is a flowchart describing a signal amplifying method in accordance with an embodiment of the present invention.

FIG. 3 is a flowchart illustrating a method for amplifying a signal in accordance with an embodiment of the present invention.

Referring to FIG. 3, the signal amplifying method according to the present embodiment includes outputting an envelope signal and a phase signal by converting a signal into a polar coordinate at step S302, outputting a multilevel quantized signal by quantizing the envelope signal into the multiple levels at step S304, controlling an amplification state using the multilevel quantized signal at step S306, and amplifying a phase signal according to the controlled amplification state at step S308. The multilevel quantization reduces a quantization noise and sustains a high efficiency even in a wide frequency band.

The controlling an amplification state at step S306 includes converting the multilevel quantized signal to a control signal having fewer levels than levels of the multilevel quantized signal; and deciding the amplification state according to the control signal. Using the control signal having fewer levels than levels of the multilevel quantized signal, complexity and size can be reduced.

Meanwhile, the multilevel quantized signal may be generated by delta-sigma converting the envelope signal.

The amplifying the phase signal at step S308 may be performed when an output power level is greater than or equal to a preset power level. The preset power level may be an output power level of the amplification corresponding to a knee voltage. By amplifying a phase signal according to the output power level, it is possible to solve a problem of limiting an input voltage and to widen a dynamic range of amplification.

Meanwhile, a phase value and a size of the phase signal can be controlled according to at least one of a supply voltage of amplification, an input power of amplification, and an amplification state. By controlling the phase value and the size of the phase signal, it is possible to correct error occurring while amplifying a signal.

Other operations of the signal amplifying method are similar to the operations of the signal amplifier according to the present embodiment. Therefore, detail description thereof is omitted.

<Embodiment of Wireless Transmitter>

Figure 4:
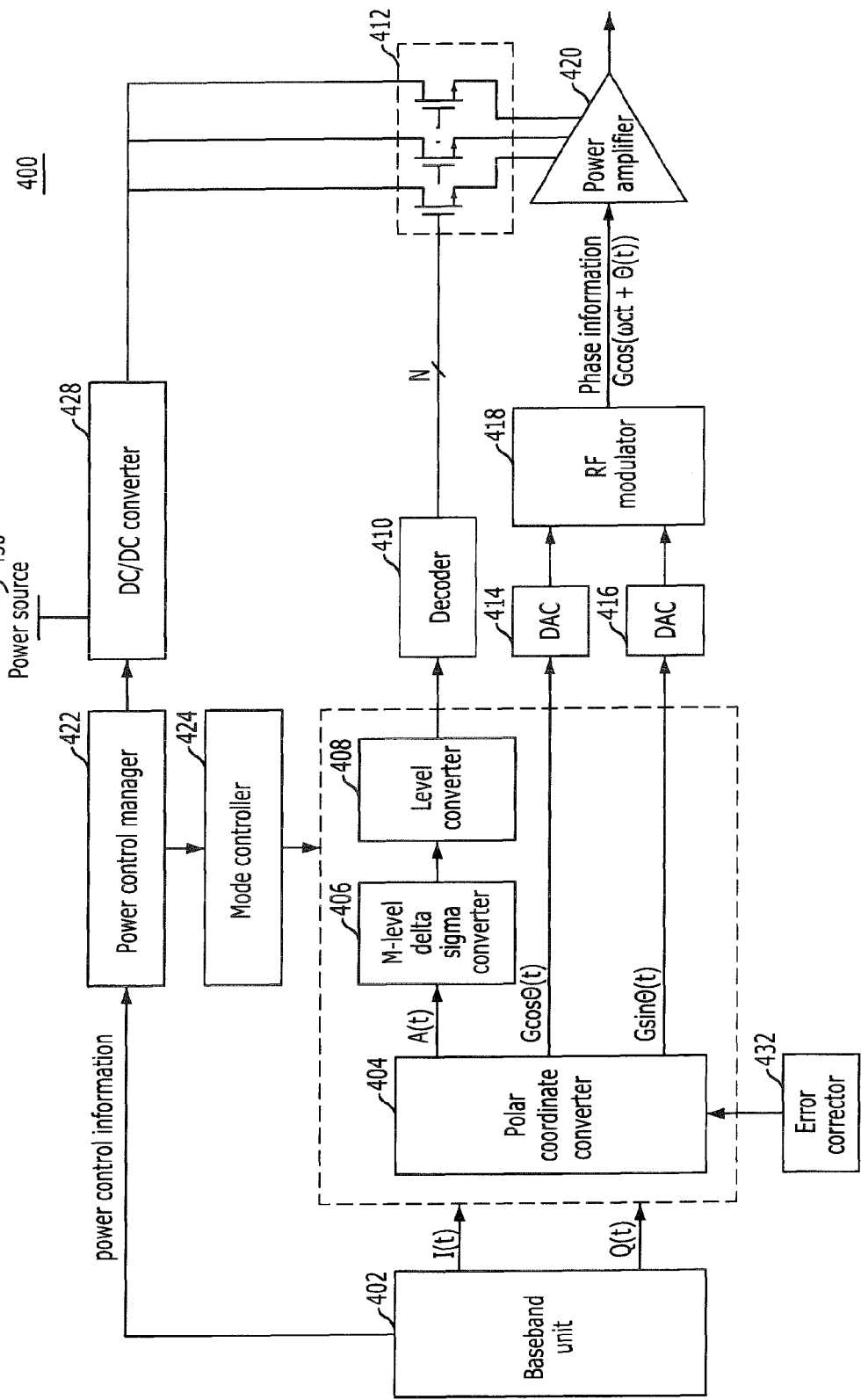
FIG. 4 is a diagram illustrating a wireless transmitter 400 in accordance with an embodiment of the present invention.

FIG. 4 is a diagram illustrating a wireless transmitter in accordance with an embodiment of the present invention.

A baseband unit 402 transfers baseband signals I(t) and Q(t) to a polar coordinate converter 404. The polar coordinate converter 404 converts the received baseband signals to polar coordinates and outputs an envelope signal A(t) and phase signals G cos θ(t) and G sin θ(t). A coordinate rotation digital computer (CORDIC) may be used as the polar coordinate converter 404.

The polar coordinate converter 404 performs oversampling on the baseband signals. The polar coordinate converter 404 may include a low pass filter (LPF) for removing image spectrum generated after performing oversampling to be identical to a clock speed of a delta-sigma converter.

A M-level delta-sigma converter 406 converts the envelope signal A(t) to M-levels. Here, M denotes an integer greater than 2. A level converter 408 converts the M-level quantized envelope signal to smaller levels, for example, N-level where N is an integer smaller than M. The M-levels may be grouped with levels having similar probability distribution. Here, M to N multiplexers (Mux) or comparators may be used as the level converter 408.

The output signal of the level converter 408 is inputted to an amplification state decider 412 through a decoder 410. The decoder 410 converts the digital output of the level converter 408 to an analog signal. The decoder 410 may be omitted in another embodiment. In this case, the output of the level converter 408 may be provided to the amplification state decider 412 directly. The amplification state decider 412 controls amplification by deciding a state of the power amplifier 420.

Meanwhile, the phase signals G cos θ(t) and G sin θ(t) are converted to analog signals by digital to analog converters DAC 414 and 416. G of a phase signal may be decided according to a size of an envelope signal. Since it is not necessary to output the phase signal as faster as an oversampling rate, the phase signals are calculated at a sampling speed of the baseband I(t) and Q(t) and provided to the DCAs 414 and 416.

When the phase signals are outputted as the analog signals by the DACs 414 and 416, image components of the phase signal are generated at a frequency corresponding to the half of the clock speed. It is removed by an analog LPF. However, when the sampling speed is low, distortion may occur if the phase signal is filtered through the LPF. In order to prevent such distortion, the phase signals may be oversampled at a predetermined rate before passing the DACs 414 and 416. Since such characteristics are decided by a bandwidth of a system or signal characteristics, the oversampling of the phase signal may be differently applied according to embodiments of the present invention.

The analog phase signal is up-modulated to radio frequency by a RF modulator 418. The modulated phase signal G cos(ω_ct+θ(t)) is provided to the power amplifier 420 as an input, and amplified according to control of the amplification state decider 412. The amplified transmission signal may be provided to an antenna port. A cell of the power amplifier 420 may be formed of a plurality of states internally, and the cell may receive power from a metal oxide semiconductor (MOS) switch according to the state.

The power amplifier 420 may include a switching power amplifier structure to have high efficiency characteristics. The input power level of the power amplifier 420 is decided according to a G value of a phase signal. Since the power amplifier 420 operates linearly according to the G value of the phase signal, the power amplifier 420 may be embodied as a Quasi-Class E/F/D formation where a bias current is applied more than a predetermined level.

The baseband unit 402 transfers power control information to the power control manager 422 in order to control an output power level of the power amplifier 420. The power control manager 422 transfers output power level information to a DC/DC converter 428 in order to control an output power level of the power amplifier 420. The DC/DC converter 428 converts a voltage of a power source 430 and supplies the converted voltage to the power amplifier 420 through an amplification state decider 412. As described above, the power control manager 422 may control the output power level of the power amplifier 420.

The power control manager 422 transfers power control information to a mode controller 424. The mode controller 424 controls an output mode of the wireless transmitter 400 according to the received power control information. Here, the mode means whether polar coordinate conversion is used or direction conversion is used to convert the baseband signal.

An output power level of the power amplifier 420 is controlled according to a voltage supplied to the amplification state decider 412. The voltage applied to the amplification state decider 412 is restricted to be greater than a knee voltage of the power amplifier 420. That is, the DC/DC converter 428 controls the output power level of the power amplifier 420 by outputting a voltage from a voltage of the power source 430 to the knee voltage. Here, Eq. 1 shows the range of changing the output power level.

$$(\text{a range of changing an output power level}) = 10*\log\{(VCC-V_{knee})2\} \quad \text{Eq. 1}$$

In Eq. 1, Vcc is a voltage of the power source 430, and $V_{knee}$ denotes a knee voltage of the power amplifier 420. In general, a knee voltage is about 0.2 to 0.3 v in a typical semiconductor. Therefore, the range of changing the output power level is about 18 to 20 dB.

That is, a signal is transmitted through a polar transmission structure by the polar coordinate converter from the maximum output power level to a predetermined output power level that is 20 dB lower than the maximum output power level. Also, a signal is transmitted through a typical direct conversion at output power levels lower than the predetermined output power level. In general, the transmission power of a wireless transmitter is in a range from the maximum output power level to the predetermined output power level 20 dB lower than the maximum output power level according to the probability distribution. Therefore, the overall efficiency of the wireless transmitter 400 is not significantly reduced because a probability of transmitting a signal through direct conversion is small.

In order to operate the wireless transmitter 400 in such two modes, the phase signal is transmitted through the direct conversion structure and two DACs 414 and 416 and the RF modulator 418 are used. Further the mode controller 424 decides the transmission mode of the wireless transmitter 400 according to the power control information. In case of operating the transmitter through the direction conversion, the polar coordinate converter 404 is not driven. In this case, the baseband signals I(t) and Q(t) outputted from the baseband unit 402 bypass the polar coordinate converter 404 and are inputted to the DACs 414 and 416, respectively. Therefore, the signal is transmitted based on the direct conversion.

The power value and the size of the phase signal may not be controlled ideally according to the state of the power amplifier 420, and error may occur according to semiconductor characteristics when the wireless transmitter 400 is embodied to a semiconductor. An error corrector 432 may correct such an error.

The error corrector 432 may use an open loop pre-distortion method. When the power amplifier 420 performs amplification in several stages according to the amplification state, the error corrector 432 extracts error of the output or the phase signal and reflects the extracted error to the Q(t) value and the G(t) value of the phase signal. That is, the error correction value may be reflected to cos θ(t) and sine (t) as a form of cos {θ(t)+θe(t)} and sin {θ(t)+θe(t)}. Gain error may be reflected to G(t) as a form of G(t)×Ge(t).

The error corrector 432 performs an AM/AM, AM/PM error method of the power amplifier 420 according to three factors. That is, the error corrector 432 corrects error according to a supply voltage Vcc, an input power, and a state of the power amplifier 420.

For example, it may be defined as θe(t)=f(VCC, input power, state), Ge(t)=g(VCC, input power, state). The functions f and g may be differently constituted according to embodiments. Such an error correction method may be embodied as a digital look up table. The lookup table may have a 3-D layout memory structure according to the supply voltage, the input power and the state of the power amplifier 420.

Figure 5:
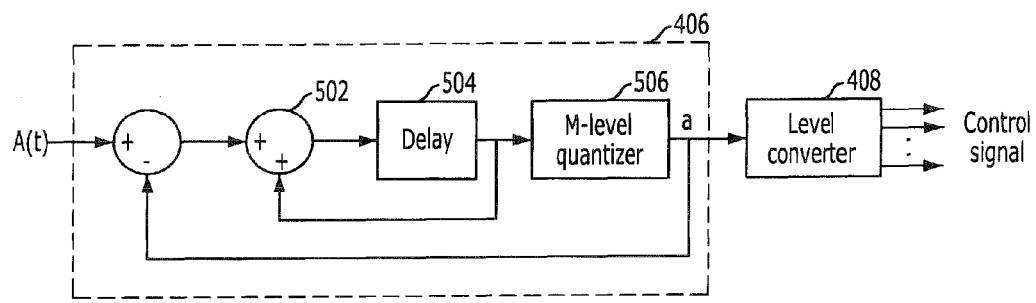
FIG. 5 is a diagram illustrating an M-level delta sigma converter 406 and a level converter 408.

FIG. 5 is a diagram illustrating a M-level delta-sigma converter 406 and a level converter 408.

The M-level delta-sigma converter 406 uses a $1^{st}$ order delta-sigma modulator. It is because the $1^{st}$ order modulator have higher out-band noise suppression that high-order delta-sigma modulator when a low oversampling rate is used. According to embodiments, high-order delta-sigma modulators such as $2^{nd}$-order or $3^{rd}$-order delta-sigma modulators may be used.

Since the $1^{st}$-order delta-sigma modulator has a simple structure, the $1^{st}$-order delta-sigma modulator may be embodied using one cell block of a delay 504. Also, the $1^{st}$-order delta-sigma modulator has very small power consumption in digital. In case of embodying the $1^{st}$-order delta-sigma modulator in a digital circuit, it is required to allocate the number of bits to express M-levels.

Unlike FIG. 5, if the $1^{st}$-order delta-sigma modulator is embodied in an analog circuit, a digital to analog converter DAC may be further included for converting a digital envelope signal A(t) to an analog signal. Here, the output of the DAC is provided to the analog delta-sigma modulator.

The M level delta-sigma converted envelope signal has a size from 0 to M according to probability distribution of a signal, and the mean size of the M level delta-sigma converted envelope signal is identical to the mean size of original envelope signal A(t). That is, the probability distribution according to a size of an envelope signal after quantization is identical to that of an original envelope signal before quantization.

Integration is performed by a delay 504 and an adder 502, and a M-bit quantized signal a is outputted by a M-level quantizer 506. The level converter 408 converts the M-level quantized signal a to an N-level control signal by grouping the M-level quantized signal. The output of the level converter 408 may have the number of digital circuit outputs as many as N. The level converter 408 may be embodied as a multiplexer. In case of embodying the level converter 408 in digital, the level converter 408 may be embodied in a lookup table.

Figure 6:
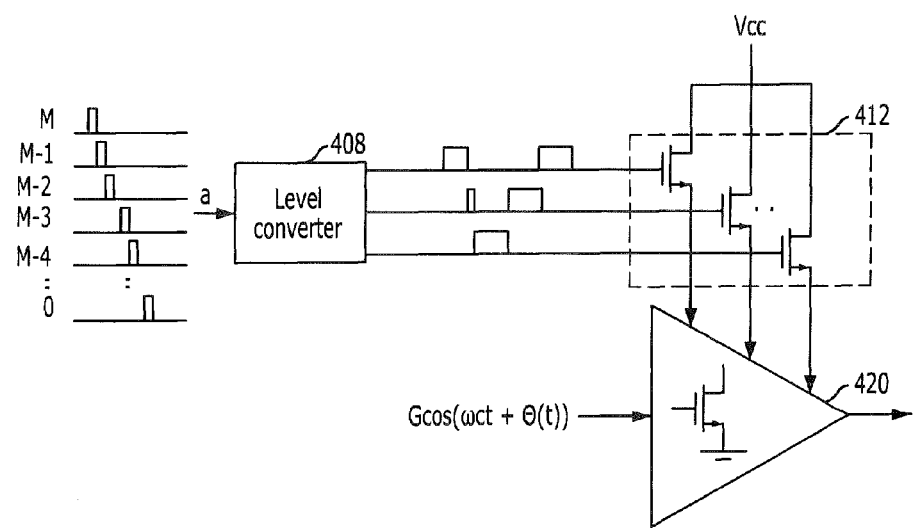
FIG. 6 is a diagram illustrating a level converter 408, an amplification state decider 412, and a power amplifier 420.

FIG. 6 is a diagram illustrating a level converter 408, an amplification state decider 412, and a power amplifier 420.

The level converter 408 receives the M-level quantized signal and outputs an N-level control signal where N is an integer smaller than M. If an amplification state of the power amplifier 420 is directly controlled with the M-level without the level converter 408, it may be ineffective because design complexity and chip size are significantly increased. Therefore, the number of levels controlling the power amplifier 420 is reduced through the level converter 408. As much as the reduction of the levels controlling the power amplifier 420, a size of a phase signal, which is an input of the power amplifier 420, is controlled. Although the high efficiency characteristics are sustained even in a low output power level about 3 to 4 dB lower than the maximum output, it is sufficiently effective.

The control signal having N levels is inputted to the amplification state decider 412 to control the N-states of the power amplifier 420. The amplification state decider 412 may be embodied as a MOS switch. The amplification state decider 412 may be embodied as a positive channel metal oxide semiconductor (POMS) in the power amplifier 408, or may be formed as a control block outside of a chip of the power amplifier 408. The amplification state decider 412 supplies power to a bias terminal of the power amplifier 408.

When the amplification state decider 412 is embodied as a MOS switch, the size of the MOS switch may be decided based on the maximum amount of current flowing according to a state. A MOS switch supplying power at the maximum output state is embodied to have a large size of a gate or an emitter, and a MOS switch supplying power at a minimum output state is embodied in a small size.

Hereinafter, signal operation will be described.

Table 2 shows inputs and outputs of the level converter 408.

TABLE 2

| Input (M-level quantized signal) | Output (N-level control signal) |
|---|---|
| M | N |
| M-1 | |
| M-2 | N-1 |
| M-3 | |
| ... | ... |

When an M-level envelope signal is inputted, the level converter 408 outputs an N-level control signal. when the N-level control signal is inputted to the amplification state controller 412, the power amplifier 420 is activated as a high power state amplifier.

When an M−1 level envelope signal is inputted, the level converter 408 also outputs the N-level control signal. Therefore, the N-level control signal is inputted to the amplification state controller 412, and the power amplifier 420 is still activated as the "high power state amplifier". A phase signal size G is decided by M−1 which is the size of the envelope signal. For example, the phase signal size G may become smaller at a rate of M−1/M compared to a phase signal size G when the M-level envelope signal is inputted. In this case, the reduction of overall efficiency is not significant because high efficiency characteristics of the power amplifier 420 are sustained even in a level about 3-4 dB smaller than the maximum output.

When M−2 or M−3 level envelope signals are inputted to the level converter 408, the level converter 408 outputs an N−1 control signal. The amplification state controller 412 receives the N−1 control signal and the power amplifier 420 is activated as a "medium power state amplifier". The phase signal size G may be controlled according to the size of the envelope signal.

Such a method makes it possible to simplify the structure of the power amplifier and to embody a delta-sigma polar coordinate transmitter with a small oversampling rate. Therefore, efficiency is significantly high.

Figure 7:
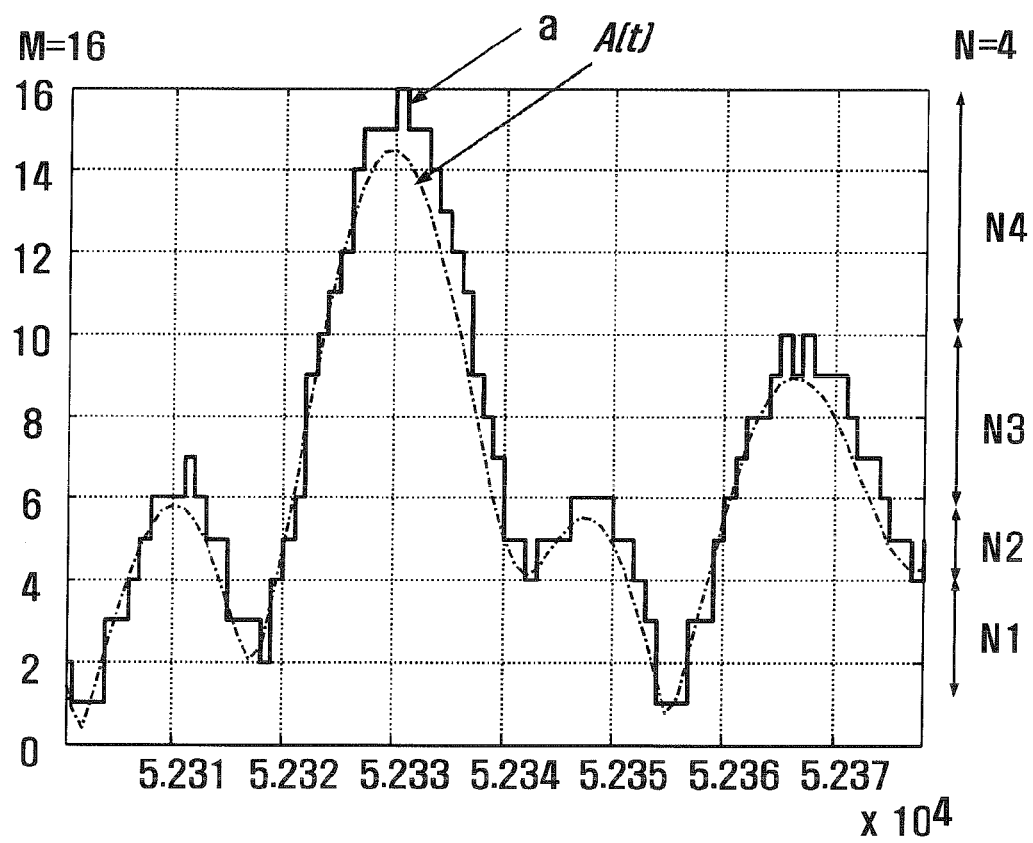

FIG. 7 is a graph showing an envelope signal A(t) and a M-level quantized signal a.

FIG. 7 shows an envelope signal A(t) converted from a baseband signal having a bandwidth of 20 MHz. Also, FIG. 7 shows a 16-level quantized signal generated by quantizing A(t) at the M-level quantizer 506. N of the right axis denotes a region that the level converter 408 groups M-levels. The level converter 408 converts 16 level quantized signals to 4 control signals according to N regions.

Figure 8:
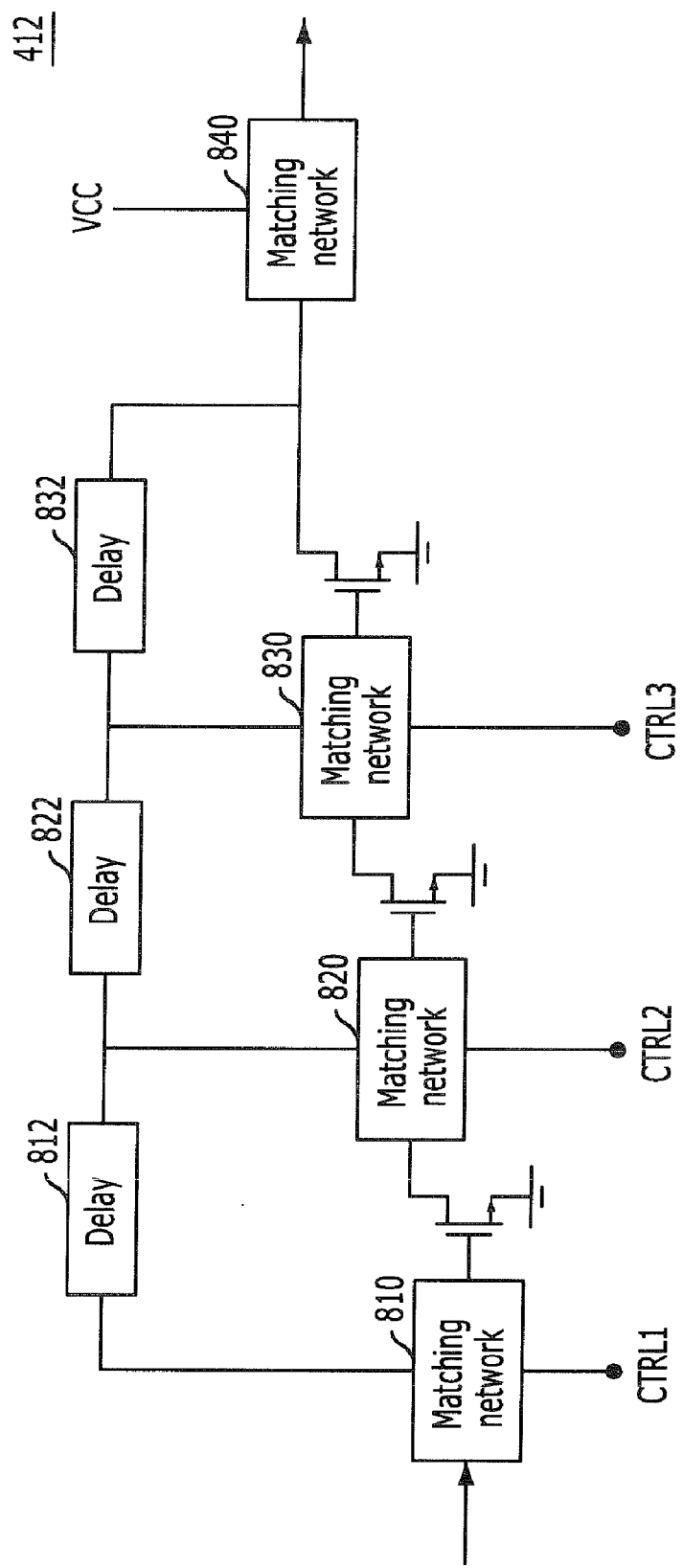
FIG. 8 is a diagram illustrating a power amplifier 420.

FIG. 8 is a diagram illustrating an amplification state decider 412 and a power amplifier 420. FIG. 8 schematically shows a structure of an amplification state decider 412 that controls amplification with four states and a structure of a power amplifier 420 having four states.

Referring to FIG. 8, the level converter 408 provides a control signal as a form of a control voltage CTRL to a three-stage power amplifier 420. FIG. 8 shows three control signals CTRL1, CTRL2, and CTRL3.

In case of controlling the power amplifier to output the smallest level, the three stage amplifier is disabled. Therefore, a phase signal inputted from a RF modulator 418 is bypassed and outputted after passing through three delays 812, 822, and 832.

In case of controlling the power amplifier to output the next large level, the control signals are provided as CTRL1="activated", CTRL2="inactivated", and CTRL3="inactivated". Therefore, the phase signal is amplified by the first state of the amplifier, and outputted after passing two delays 822 and 832.

In case of controlling the power amplifier to output the third level, the control signals are provided as CTRL1="activated", CTRL2="activated", and CTRL3="inactivated". Therefore, the phase signal is amplified by the first stage and the $2^{nd}$ stage of the amplifier and outputted after passing the delay 832.

In case of controlling the power amplifier to output the largest level, the control signals are provided as CTRL1="activated", CTRL2="activated", and CTRL3="activated". Therefore, the phase signal is amplified by the three stages of the amplifier and outputted.

The three stage power amplifier 420 optimizes power and gain to a system according to each state. The amplification state decider 412 and the power amplifier 420 may be embodied as a Hetero junction Bipolar Transistor (HJBT) or a Complementary Metal Oxide Semiconductor (CMOS). Since a detail circuit may be embodied in various ways according to embodiments, the detail description thereof is omitted.

Figure 9A:
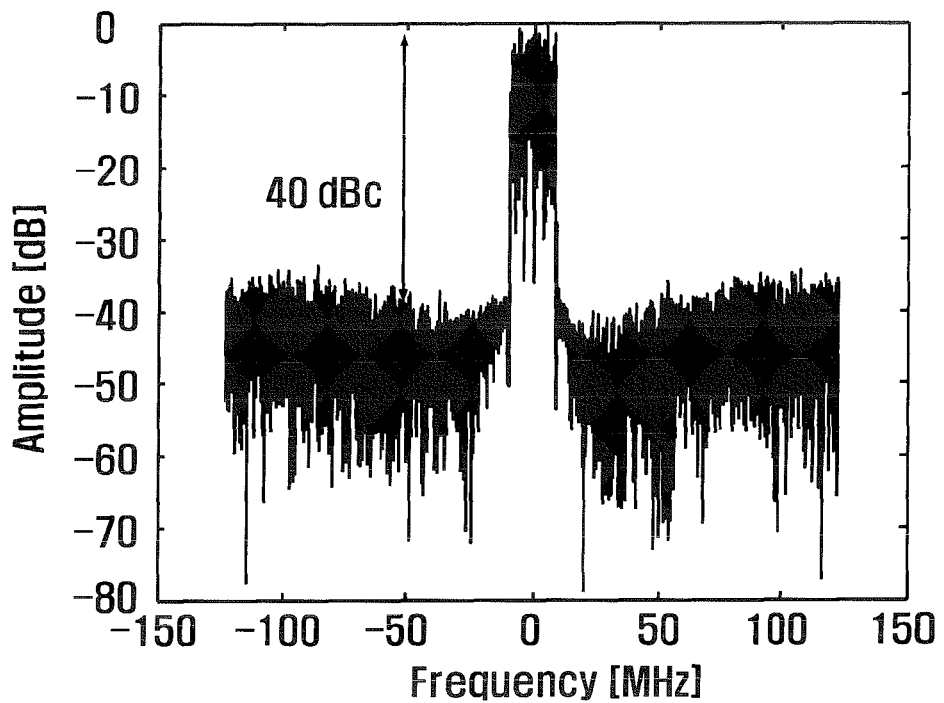
FIGS. 9A and 9B are graphs illustrating transmission output of the wireless transmitter 400 and the efficiency of the power amplifier 420.
Figure 9B:
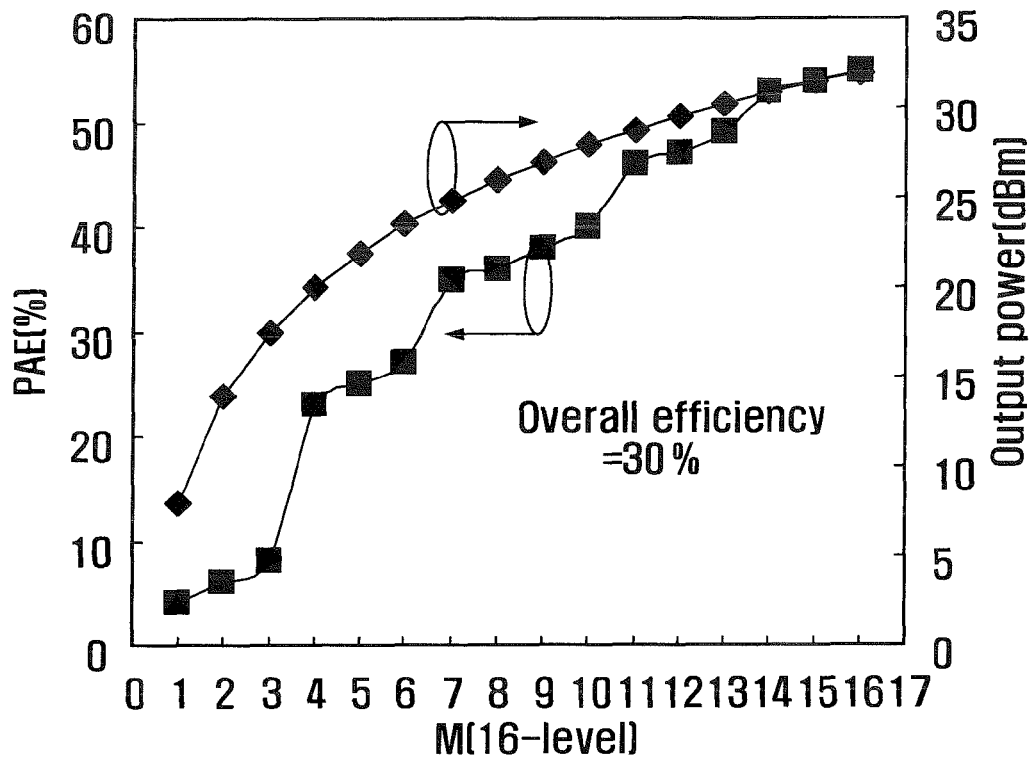

FIGS. 9A and 9B are graphs showing transmission output of a wireless transmitter 400 and efficiency of a power amplifier 420. FIGS. 9A and 9B show spectrum of a 3G LTE uplink transmission signal having a wideband bandwidth of 20 MHz when the wireless transmitter 400 of FIG. 4 is used. A M-level delta sigma converter 406 uses 16-level conversion, and the level converter 408 converts the 16 level to 4 state (N=4).

FIG. 9A shows a RF spectrum when an oversampling rate is 8.

FIG. 9B shows an output power of a power amplifier 420 having four states and efficiency thereof according to M-level. When the maximum channel output power is calculated as 23 dBm based on the graph of FIG. 9B, the power efficiency is about 30%. It is twice or triple of the power efficiency of the power amplifier employing a typical Class AB method, which is about 10 to 15%. As shown, the wireless transmitter 400 according to the present embodiment has high efficiency characteristics.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, the signal amplifier according to the present invention can amplify a signal with a high efficiency even in a wide frequency band.

The signal amplifier according to the present invention provides excellent channel leakage power characteristics and error characteristics in amplifying a signal.

While the present invention has been described with respect to the specific embodiments, it will be apparent to those skilled in the art that various changes and modifications may be made without departing from the spirit and scope of the invention as defined in the following claims.

What is claimed is:

1. A signal amplifier, comprising:
a polar coordinate converter configured to output an envelope signal and a phase signal by converting a signal to a polar coordinate;
a multilevel quantizer configured to output a multilevel quantized signal by quantizing the envelope signal to multiple levels;
an amplification state controller configured to control an amplification state using the multilevel quantized signal; and
a power amplifier configured to amplify the phase signal according to the controlled amplification state,
wherein the multilevel quantized signal has more than two levels,
wherein the amplification state controller converts the multilevel quantized signal to a control signal having fewer levels than the levels of the multilevel quantized signal by grouping the multiple levels having similar output power levels.

2. The signal amplifier of claim 1, wherein the amplification state controller includes:
a level converter configured to convert the multilevel quantized signal to a control signal having fewer levels than levels of the multilevel quantized signal; and
an amplification state decider configured to decide the amplification state according to the control signal.

3. The signal amplifier of claim 2, wherein the control signal is decided using probability distribution according to a level of the multilevel quantized signal.

4. The signal amplifier of claim 2, wherein a size of the phase signal is controlled according to a size of the envelope signal.

5. The signal amplifier of claim 1, wherein the multilevel quantized signal is generated by delta-sigma converting the envelope signal.

6. The signal amplifier of claim 1, further comprising:
a mode controller configured to control the polar coordinate converter to output the envelope signal and the phase signal when an output power level of the power amplifier is setup to be greater than or equal to a preset power level.

7. The signal amplifier of claim 6, wherein the preset power level is an output power level corresponding to a knee voltage of the power amplifier.

8. The signal amplifier of claim 1, further comprising:
an error corrector configured to control a phase value or a size of the phase signal according to at least one of a supply voltage of the power amplifier, an input power of the power amplifier, and the amplification state.

9. A wireless transmitter, comprising:
a polar coordinate converter configured to output an envelope signal and a phase signal by converting a signal into a polar coordinate;
a multilevel quantizer configured to output a multilevel quantized signal by quantizing the envelope signal into multiple levels;
an amplification state controller configured to control an amplification state by using the multilevel quantized signal; and
a power amplifier configured to amplify the phase signal according to the controlled amplification state,
wherein the multilevel quantized signal has more than two levels,
wherein the amplification state controller converts the multilevel quantized signal to a control signal having fewer levels than the levels of the multilevel quantized signal by grouping the multiple levels having similar output power levels.

10. The wireless transmitter of claim 9, wherein the amplification state controller includes:
   a level converter configured to convert the multilevel quantized signal to a control signal having fewer levels than levels of the multilevel quantized signal; and
   an amplification stage decider configured to decide the amplification state according to the control signal.

11. The wireless transmitter of claim 10, wherein a size of the phase signal is controlled according to a size of the envelope signal.

12. The wireless transmitter of claim 10, further comprising:
   a mode controller configured to control the polar coordinate converter to output the envelope signal and the phase signal when an output power level of the power amplifier is setup to be greater than or equal to a preset power level.

13. A method of amplifying a signal, comprising:
   outputting an envelope signal and a phase signal by converting a signal into a polar coordinate;
   outputting a multilevel quantized signal by quantizing the envelope signal to multiple levels;
   controlling an amplification state using the multilevel quantized signal; and
   amplifying the phase signal according to the controlled amplification state,
   wherein the multilevel quantized signal has more than two levels,
   wherein the multilevel quantized signal is converted to a control signal having fewer levels than the levels of the multilevel quantized signal by grouping the multiple levels having similar output power levels.

14. The method of claim 13, wherein said controlling an amplification state includes:
   converting the multilevel quantized signal to a control signal having fewer levels than levels of the multilevel quantized signal; and
   deciding the amplification state according to the control signal.

15. The method of claim 14, wherein the control signal is decided using probability distribution of the signal according to a level of the multilevel quantized signal.

* * * * *